US006782092B2

(12) United States Patent
Mashimo et al.

(10) Patent No.: US 6,782,092 B2
(45) Date of Patent: Aug. 24, 2004

(54) RESERVATION SYSTEM AND METHOD

(75) Inventors: Takeshi Mashimo, Yokohama (JP); Takatoshi Kaneko, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 97 days.

(21) Appl. No.: 10/207,171

(22) Filed: Jul. 30, 2002

(65) Prior Publication Data

US 2003/0026408 A1 Feb. 6, 2003

(30) Foreign Application Priority Data

Aug. 1, 2001 (JP) ........................................ 2001-232983

(51) Int. Cl.[7] .............................................. H04M 3/00
(52) U.S. Cl. ............................. 379/265.09; 379/210.01
(58) Field of Search ....................... 379/265.09, 265.01, 379/265.02, 309, 210.01

(56) References Cited

U.S. PATENT DOCUMENTS 6,493,447 B1 * 12/2002 Goss et al. ............ 379/265.09

FOREIGN PATENT DOCUMENTS

JP 2001-53884 2/2001

* cited by examiner

Primary Examiner—Creighton Smith
(74) Attorney, Agent, or Firm—McDermott Will & Emery LLP

(57) ABSTRACT

A reservation system and method are provided that allow a user, who wants to receive a telephone inquiry or consultation service but cannot get through because an operator's line is busy, to reliably receive the service by making a callback reservation with a time or condition specified over the Internet without needing further telephone calls. The user enters customer information, such as a customer ID, name, and telephone number, and a reservation time or a reservation condition and makes a reservation. A reservation acceptance unit accepts the reservation from the user and notifies the user of reservation completion. When a user-specified time has come or a user-specified condition is satisfied, a reservation monitor unit notifies an operator of the reservation request to prompt the operator to call up the user. After the operator starts request processing, a reservation-request-processing update unit updates a processing status of the reservation request.

12 Claims, 12 Drawing Sheets

FIG.5
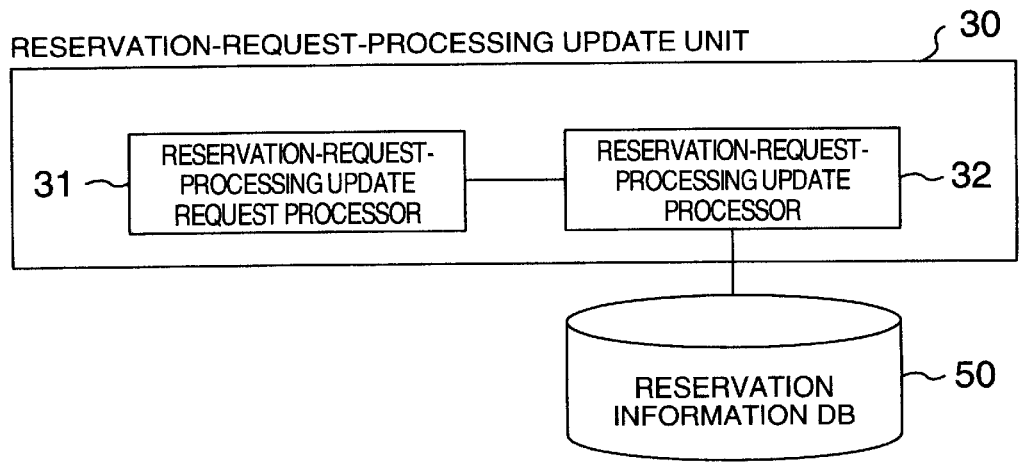
FIG.6
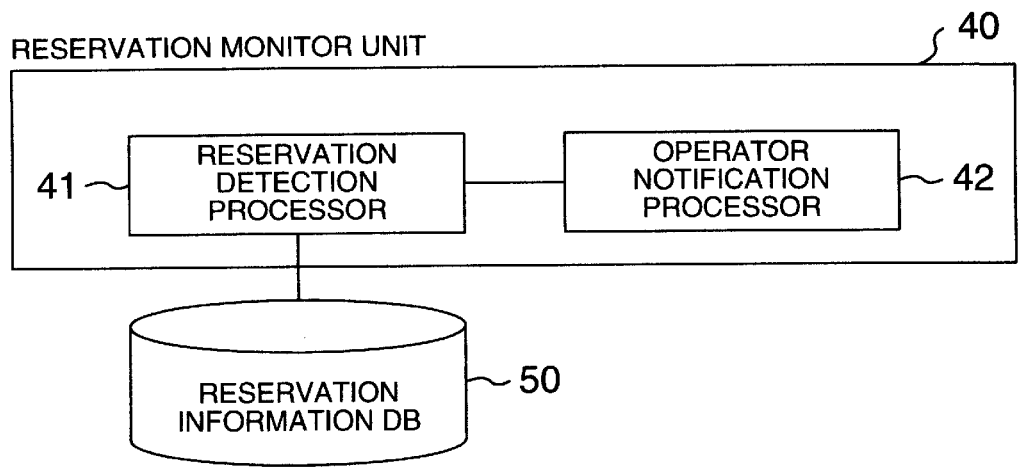
FIG.7
CONTENTS OF RESERVATION INFORMATION DB
| 51 | 52 | 53 | 54 | 55 | 56 |
|---|---|---|---|---|---|
| RESERVATION ID | CUSTOMER ID | CUSTOMER NAME | TELEPHONE NO. | RESERVATION TIME/ CONDITION | PROCESSING STATUS |
| ⋮ | ⋮ | ⋮ | ⋮ | ⋮ | ⋮ |

FIG.8

RESERVATION STATUS SCREEN

MARCH 1ST (THURSDAY)

| 9:00 | 10:00 | 11:00 | 12:00 | 13:00 | 14:00 | 15:00 | 16:00 | 17:00 |
|---|---|---|---|---|---|---|---|---|
| RE-SERVED | RE-SERVED | FREE | RE-SERVED | RE-SERVED | FREE | RE-SERVED | FREE | RE-SERVED |
| RE-SERVED | RE-SERVED | FREE | RE-SERVED | FREE | RE-SERVED | FREE | FREE | RE-SERVED |
| FREE | FREE | FREE | RE-SERVED | RE-SERVED | FREE | FREE | FREE | RE-SERVED |

CUSTOMER ID [ ]

NAME [ ]

TELEPHONE NUMBER [ ]

102 — [ ENTER DETAILED RESERVATION CONDITION ]

103 — [ RESERVE ]

FIG.9

DETAILED RESERVATION CONDITION ENTRY SCREEN

IMMEDIATELY　　　　　　　　　　　　　　　[ SET ] 201

ANY TIME AFTER [ ]　　　　　　　　　　　[ SET ]

ANY TIME FROM [ ] TO [ ]　　　　　　　　[ SET ]

OTHERS [ ]　　　　　　　　　　　　　　　　[ SET ]

FIG.10

RESERVATION CONFIRMATION SCREEN ~300

| | |
|---|---|
| CUSTOMER ID | XXXXXXXX |
| NAME | XXXXXXXX |
| TELEPHONE NUMBER | XXX-XXX-XXXX |
| RESERVATION TIME | 13:00 ON MARCH 1ST (THURSDAY) |

CONFIRM RESERVATION. OK?

[ OK ] ~301   [ CANCEL ] ~302

FIG.11

RESERVATION COMPLETION SCREEN ~400

RESERVATION COMPLETED

RESERVATION ID    XXXXXXXXXX

FIG.12

RESERVATION REQUEST PROCESSING STATUS SCREEN

MARCH 1ST (THURSDAY)

| | 9:00 | 10:00 | 11:00 | 12:00 | 13:00 | 14:00 | 15:00 | 16:00 | 17:00 |
|---|---|---|---|---|---|---|---|---|---|
| RESERVATION ID | XXXX | XXXX | FREE | XXXX | XXXX | FREE | XXXX | FREE | XXXX |
| PROCESSING STATUS | PROC-ESSED | IN PROC-ESS | | UNPROC-ESSED | UNPROC-ESSED | | UNPROC-ESSED | | UNPROC-ESSED |
| OPERATOR | XXXX | XXXX | | | | | | | |
| RESERVATION ID | XXXX | XXXX | FREE | FREE | FREE | FREE | XXXX | FREE | FREE |
| PROCESSING STATUS | PROC-ESSED | UNPROC-ESSED | | | | | UNPROC-ESSED | | |
| OPERATOR | XXXX | XXXX | | | | | | | |

RESERVATION REQUEST PROCESSING UPDATE SCREEN

| | |
|---|---|
| RESERVATION ID | XXXXXXXX |
| CUSTOMER ID | XXXXXXXX |
| NAME | XXXXXXXX |
| TELEPHONE NUMBER | XXX-XXX-XXXX |
| RESERVATION TIME | 13:00 ON MARCH 1ST (THURSDAY) |
| CURRENT STATUS | UNPROCESSED |

[START PROCESSING] ~601

604

RESERVATION REQUEST PROCESSING UPDATE SCREEN

| | |
|---|---|
| RESERVATION ID | XXXXXXXX |
| CUSTOMER ID | XXXXXXXX |
| NAME | XXXXXXXX |
| TELEPHONE NUMBER | XXX-XXX-XXXX |
| RESERVATION TIME | 13:00 ON MARCH 1ST (THURSDAY) |
| CURRENT STATUS | IN PROCESS |

[UPDATE DATA] ~602    [COMPLETE PROCESSING] ~603

FIG.14

CALLBACK NOTIFICATION SCREEN

RESERVATION ID      XXXXXXXX

CUSTOMER ID         XXXXXXXX

NAME                XXXXXXXX

TELEPHONE NUMBER    XXX-XXX-XXXX

RESERVATION TIME    13:00 ON MARCH 1ST (THURSDAY)

START PROCESSING —701

RESERVATION SYSTEM AND METHOD

BACKGROUND OF THE INVENTION

The present invention relates to a reservation system and method, and more particularly to a reservation system and method that allow a user, who wants to receive a telephone inquiry or consultation service but cannot get through because telephone inquiries are concentrated, to reliably receive the service by making a callback reservation with a time and a condition specified over the Internet without having to make further telephone calls.

Conventionally, when a user wants to receive a telephone inquiry or consultation service but cannot get through because the operator's line is busy, the user must call up an operator many times until the user successfully gets through.

In the conventional method described above, the user must call up an operator many times and, until the user successfully gets through, the user cannot receive an inquiry or consultation service. This requires the user to spend time calling up the window repeatedly and sometimes results in the user making complaints about it.

In addition, if the operator's line of a company is busy, the company gives trouble to, and creates dissatisfaction among, the users. This sometimes results in additional costs and a drop in company's credibility among the users. As the prior art, refer to JP-A-2001-53884.

SUMMARY OF THE INVENTION

It is an object of the present invention to solve the problems described above and to provide a system and method that allow a user, who wants to receive a telephone inquiry or consultation service, to reliably receive the service.

To achieve the above objects, the present invention provides a reservation system used by a user for receiving a telephone inquiry or consultation service. The reservation system comprises a reservation acceptance unit that accepts conditions including a reservation time and a reservation condition from a user who will receive a telephone inquiry or consultation service; a reservation status checking unit that displays a reservation status screen in response to a reservation status checking request from an operator who is in charge of receiving inquiries or consultations from the user; a reservation-request-processing update unit that updates a processing status of a reservation request, with the reservation request specified on the reservation status screen, according to an instruction from the operator; and a reservation monitor unit that detects a reservation request reaching a reservation time specified by the user or satisfying a reservation condition specified by the user and that, for the detected reservation request, prompts the operator to call up the user who has made the reservation.

In the above-described reservation system according to the present invention, the reservation status checking unit displays the reservation status screen in response to a reservation status checking request from the user.

In the above-described reservation system according to the present invention, the reservation status screen displays time zones, reservation request IDs reserved in each of the time zones, and processing statuses of reservation requests associated with the IDs, each processing status indicating one of "processed", "in process", and "unprocessed", and the operator may update, through the reservation-request-processing update unit, the processing status of each reservation request from "unprocessed" to "in process" or to "processed" or from "in process" to "processed".

In the above-described reservation system according to the present invention, upon detecting that the reservation time specified by the user has come or the reservation condition specified by the user is satisfied, the reservation monitor unit displays a notification screen prompting the operator to call up the user who has made the reservation, changes the processing status of the reservation request to "in process" when one of operators who view the notification screen points a Start function box on the notification screen and, at the same time, erases the notification screens of other operators.

In the above-described reservation system according to the present invention, the system further comprises a processor that, when making a call to the user for the reservation request, the operator automatically dials a telephone number of the user who has issued the reservation request.

In addition, the present invention provides a reservation method in which a reservation is made by telephone. The reservation method comprises the steps of accepting a callback reservation specifying a reservation time or a reservation condition from a user who receives a telephone inquiry or consultation service; in response to a reservation status checking request from an operator who is in charge of accepting inquiries or consultations, checking a reservation status with a reservation status screen displayed; updating a processing status of a reservation request, with the reservation request specified on the reservation status screen, according to an instruction from the operator; and detecting a reservation request reaching a reservation time specified by the user or satisfying a reservation condition specified by the user and, for the detected reservation request, prompting the operator to call up the user who has made the reservation.

Other objects, features and advantages of the invention will become apparent from the following description of the embodiments of the invention taken in conjunction with the accompanying drawings.

BRIEF DESCRIPTION OF THE DRAWINGS

FIG. 5 is an example of a diagram showing the internal configuration of a reservation-request-processing update unit.

FIG. 6 is an example of a diagram showing the internal configuration of a reservation monitor unit.

FIG. 7 is an example of a diagram showing the contents of a reservation information DB.

FIG. 8 is an example of a diagram showing a user's reservation status screen.

FIG. 9 is an example of a diagram showing a user's detailed reservation condition entry screen.

FIG. 10 is an example of a diagram showing a user's reservation confirmation screen.

FIG. 11 is an example of a diagram showing a user's reservation completion screen.

FIG. 12 is an example of a diagram showing an operator's reservation request processing status screen.

FIG. 13 is an example of a diagram showing an operator's reservation request processing update screen.

FIG. 14 is an example of a diagram showing an operator's notification screen.

DESCRIPTION OF THE EMBODIMENTS

An embodiment of the present invention will be described with reference to the drawings.

Figure 1:
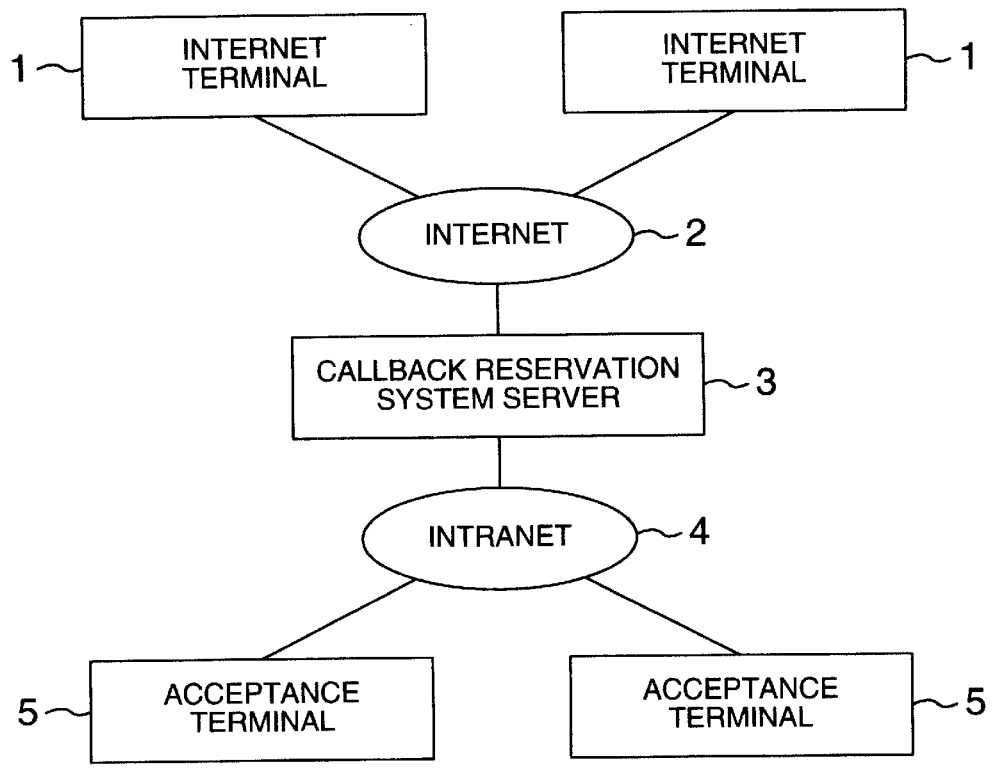
FIG. 1 is an example of a diagram showing the configuration of a reservation system in an embodiment of the present invention.

FIG. 1 is a general diagram of a reservation system in an embodiment of the present invention. A callback reservation system server 3 is a server that controls and manages call back reservations. A user who is going to receive a telephone inquiry service or consultation service uses an Internet terminal 1, connected to an Internet 2, to make a callback reservation or check the reservation status. An operator uses an acceptance terminal 5, connected to an intranet 4, to check the reservation request processing status and process reservation requests.

Figure 2:
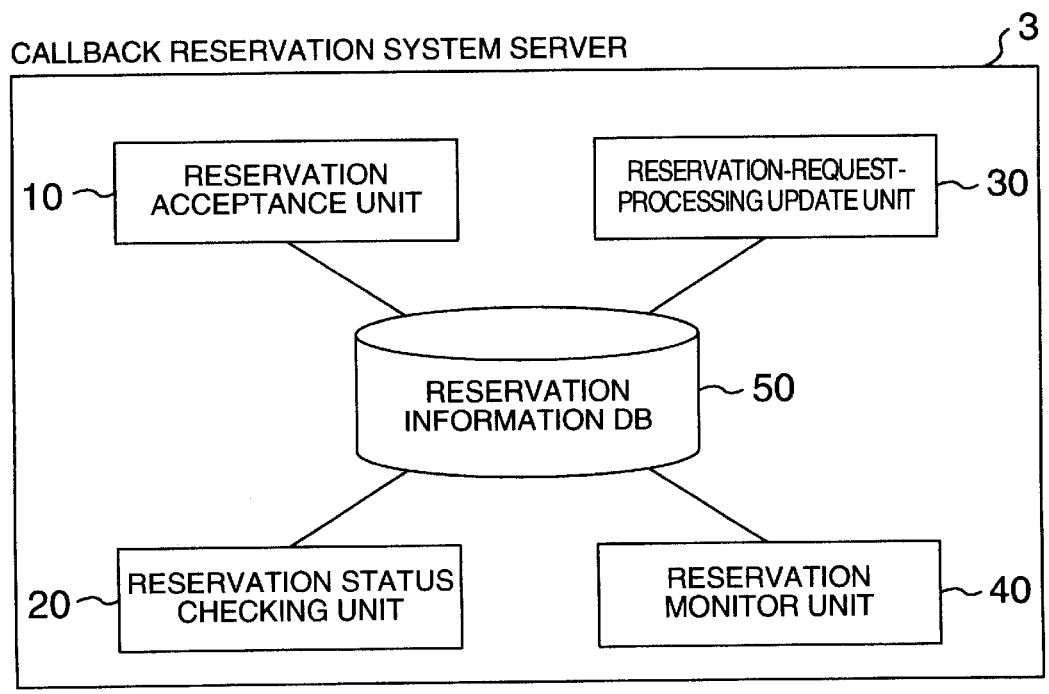
FIG. 2 is an example of a diagram showing the internal configuration of a reservation system server.

FIG. 2 is a diagram showing the internal configuration of the callback reservation system server 3 shown in FIG. 1. The callback reservation system server 3 comprises functional units, including a reservation acceptance unit 10, a reservation status checking unit 20, a reservation-request-processing update unit 30, and a reservation monitor unit 40, and a reservation information DB (database) 50 accessible to the function units.

The reservation acceptance unit 10 accepts a callback reservation from a user and informs the user that the reservation has been completed. The reservation status checking unit 20 creates a callback reservation status information screen and displays it on the user terminal to allow the user to check the callback reservation status. The reservation status checking unit 20 also creates a reservation request processing status screen and displays it on the operator terminal to allow the operator to check the reservation request processing status. The reservation-request-processing update unit 30 updates the reservation request processing status to allow the operator to start processing for a reservation request, enter the processing status progress, and complete the processing. The reservation monitor unit 40 finds a reservation request that has reached a user-specified time or that satisfies a user-specified condition to prompt an operator to call up the user when the user-specified time has come or the user-specified condition is satisfied. If such a reservation request is found, the reservation monitor unit 40 informs the operator of the reservation request. The reservation information DB 50 is a database that manages reservation information.

FIG. 7 is a diagram showing the contents of the reservation information DB 50. The reservation information DB 50 stores and manages a reservation ID 51 that is unique to each piece of reservation information, a customer ID 52 indicating a number unique to each customer (the customer ID is not a required item in the database because a user without a customer ID may also use the callback reservation system), a customer name 53, a telephone number 54 necessary for an operator to call up a user, a reservation time/condition 55 indicating a time or a condition at or under which the user wants an operator to call up the user, and processing status 56 indicating the current status, or the person in charge, of the reservation request.

Next, with reference to FIGS. 3–6, the configuration of the components of the callback reservation system server 3 in shown in FIG. 2 and their general processing will be described.

Figure 3:
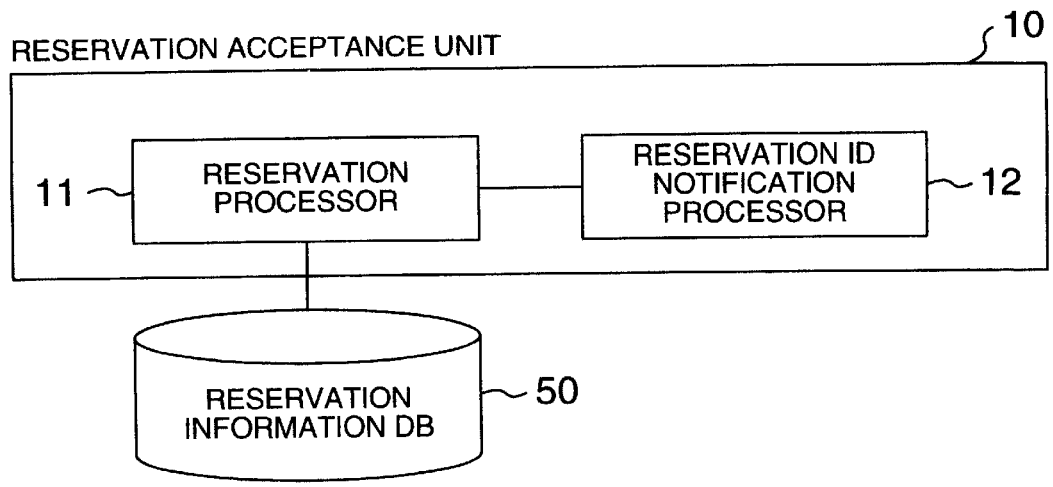
FIG. 3 is an example of a diagram showing the configuration of a reservation acceptance unit.

First, with reference to FIG. 3, the configuration and the general processing of the reservation acceptance unit 10 will be described. The reservation acceptance unit 10 comprises a reservation processor 11 and a reservation ID notification processor 12. The reservation processor 11 accepts a callback request from a user and, to check if the request is acceptable, accesses the reservation information DB 50. If the request is acceptable, the reservation processor 11 assigns a unique reservation ID to the reservation and registers the reservation ID, customer information (customer ID, customer name, and telephone number) and the reservation time/condition with the reservation information DB 50. The reservation ID notification processor 12 notifies the user of the reservation ID assigned by the reservation processor 11.

Figure 4:
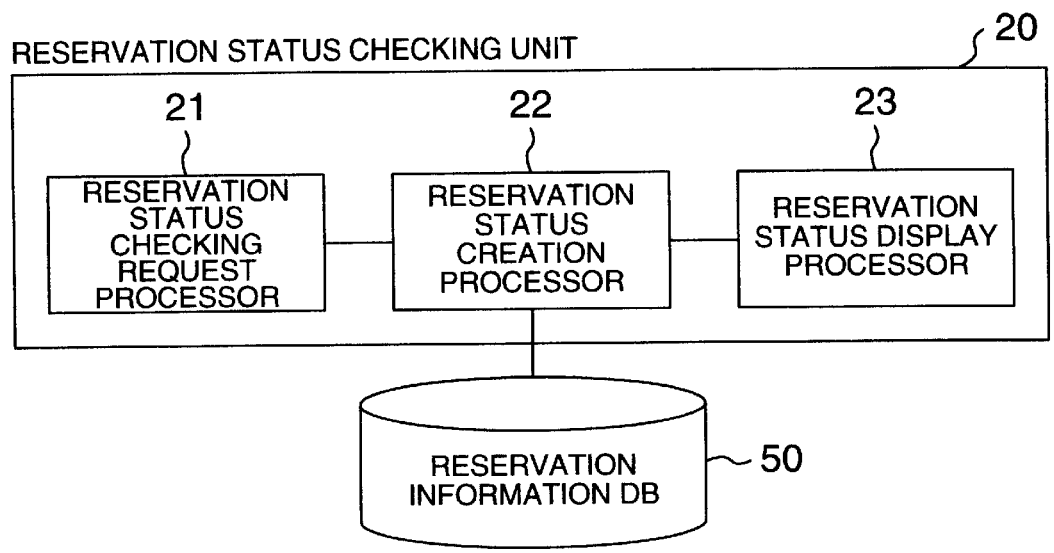
FIG. 4 is an example of a diagram showing the internal configuration of a reservation status checking unit.

Next, with reference to FIG. 4, the configuration and the general processing of the reservation status checking unit 20 will be described. The reservation status checking unit 20 comprises a reservation status checking request processor 21, a reservation status creation processor 22, and a reservation status display processor 23. The reservation status checking request processor 21 accepts a checking request for the reservation status or for the reservation request processing status from a user or an operator. Upon accepting the checking request, the reservation status creation processor 22 creates a reservation status screen or a reservation request processing status screen and causes the reservation status display processor 23 to display the screen on the user terminal or the operator terminal.

The reservation status creation processor 22 accesses the reservation information DB 50 to get information necessary to create the reservation status screen or the reservation request processing status screen. Which screen, that is, user's screen or operator's screen, is created depends on who has made the request, a user or an operator. When a user has made the request, the screen shown in FIG. 8 is created. This user's screen displays only the reservation status only, but not customer information on each reservation request. When an operator has made the request, the screen shown in FIG. 12 is created. This operator's screen displays all information registered with the reservation information DB 50, including the status and the person in charge of each reservation request.

Next, with reference to FIG. 5, the configuration and the general processing of the reservation-request-processing update unit 30 will be described. The reservation-request-processing update unit 30 comprises a reservation-request-processing update request processor 31 and a reservation-request-processing update processor 32. The reservation-request-processing update request processor 31 receives an update request for reservation request processing status from an operator. The contents of the update request from the operator include the start of processing for a reservation request, the progress report on status to date, and the completion of processing. In response to this update request, the reservation-request-processing update processor 32 accesses the reservation information DB 50 and update the processing status.

Finally, with reference to FIG. 6, the configuration and the general processing of the reservation monitor unit 40 will be described. The reservation monitor unit 40 comprises a reservation detection processor 41 and an operator notification processor 42. The reservation detection processor 41 accesses the reservation information DB 50 at a regular interval to detect a reservation request that has reached a specified time or a reservation request that satisfies a specified condition. A reservation request that is detected is notified to the operator by the operator notification processor 42.

Next, referring to the screens shown in FIGS. 8–14 and the flowcharts in FIGS. 15–18, the operation flow of the components included in the callback reservation system server 3 shown in FIG. 2 will be described.

Figure 15:
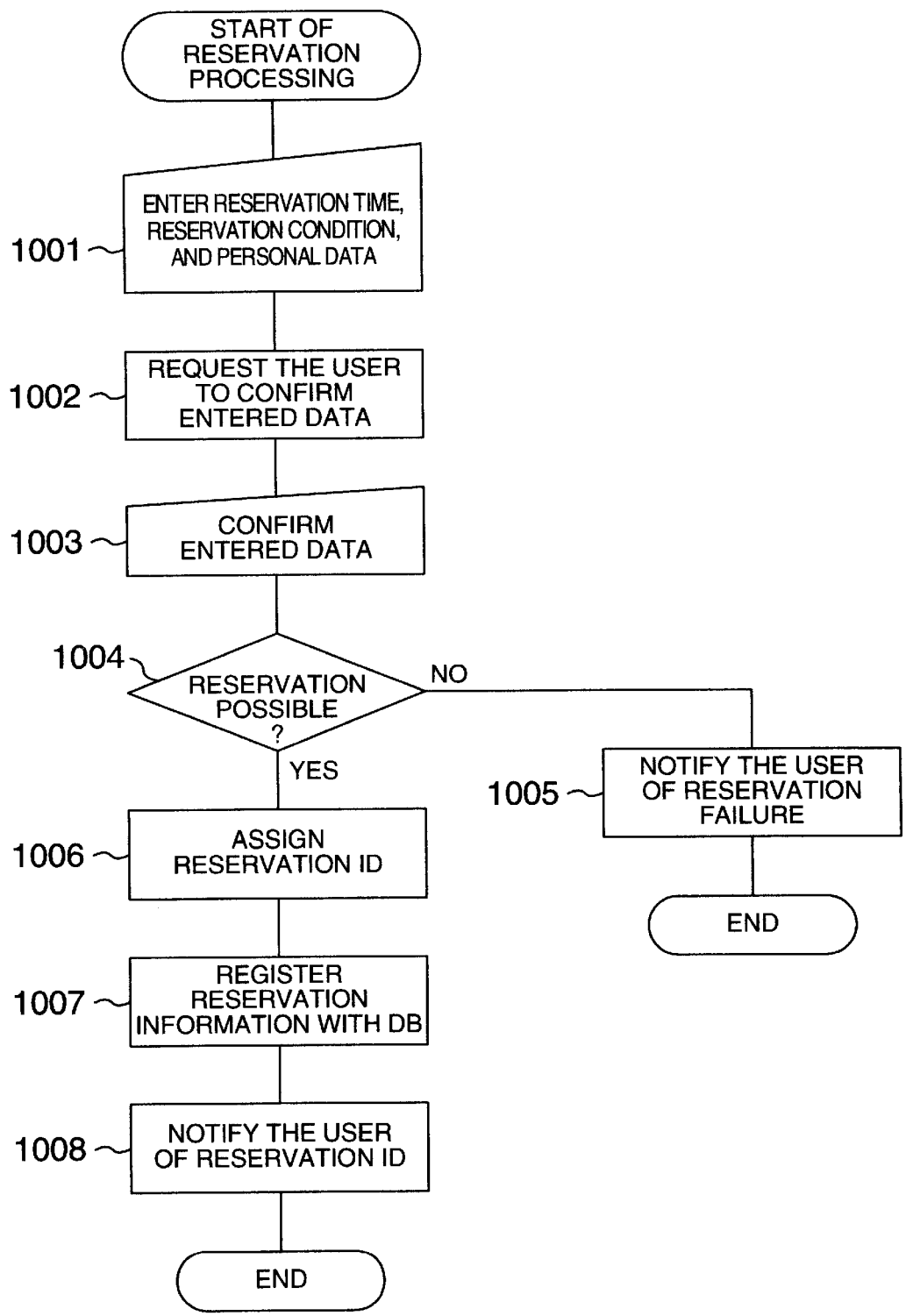
FIG. 15 is an example of a flowchart showing the flow of processing performed when a user makes a reservation.

FIG. 15 is a flowchart showing the flow of processing performed when a user makes a callback reservation. In this flowchart, it is assumed that the user has already issued a reservation status checking request and that the reservation status screen in FIG. 8 is displayed on the user's Internet terminal 1 according to the procedure shown in the flowchart in FIG. 16. The flowchart in FIG. 16 will be detailed later.

FIG. 8 is a diagram showing the reservtion status screen displayed on the user's Internet terminal 1. Each time zone button 101 on this reservation status screen 100 indicates the reservation status of the time zone. The user enters customer information, such as the customer ID, name, and telephone number, and a reservation time or a reservation condition through the screen shown in FIG. 8 and then points a Reserve function box 103 (step 1001). Because a user not having a customer ID may also use the callback reservation system, a new user may make a reservation by entering only the name and the telephone number with the customer ID left blank and then pointing the Reserve function box 103.

When the user wants to directly specify a free reservation time on the screen shown in FIG. 8, he or she can specify a reservation time simply by pointing the time zone function box 101 that is indicated as "free". To specify the reservation time and reservation condition more in detail, the user points a function box 102. Then, a detailed reservation condition entry screen 200 shown in FIG. 9 is displayed to allow the user to specify the condition using redundant expressions such as "Any time", "Any time after a specified time", and "Any time from a specified time to another specified time". The user may also specify any condition he or she desires.

After the user enters the time and the condition, the reservation processor 11 displays the reservation confirmation screen shown in FIG. 10 on the Internet terminal 1 to request the user to confirm that the user-entered data contains no error (step 1002). The user checks that the reservation contents contain no error on the screen shown in FIG. 10 and points an OK function box 301 (step 1003).

The reservation processor 11 verifies the entered data to check if it is possible to make a reservation (step 1004). If the entered data contains an error or if the entered data contains no data but another user has already made the reservation, the reservation processor 11 notifies the user that the reservation has field (step 1005) and ends processing. If it is possible to make a reservation, the reservation processor 11 assigns a unique reservation ID to the reservation (step 1006) and registers the reservation ID, customer information (customer ID, customer name, and telephone number), and reservation time/condition with the reservation information DB 50 (step 1007). For the assigned reservation ID, the reservation ID notification processor 12 creates the reservation completion screen shown in FIG. 11, displays the reservation completion screen on the user's Internet terminal 1 (step 1008) and ends processing.

Figure 16:
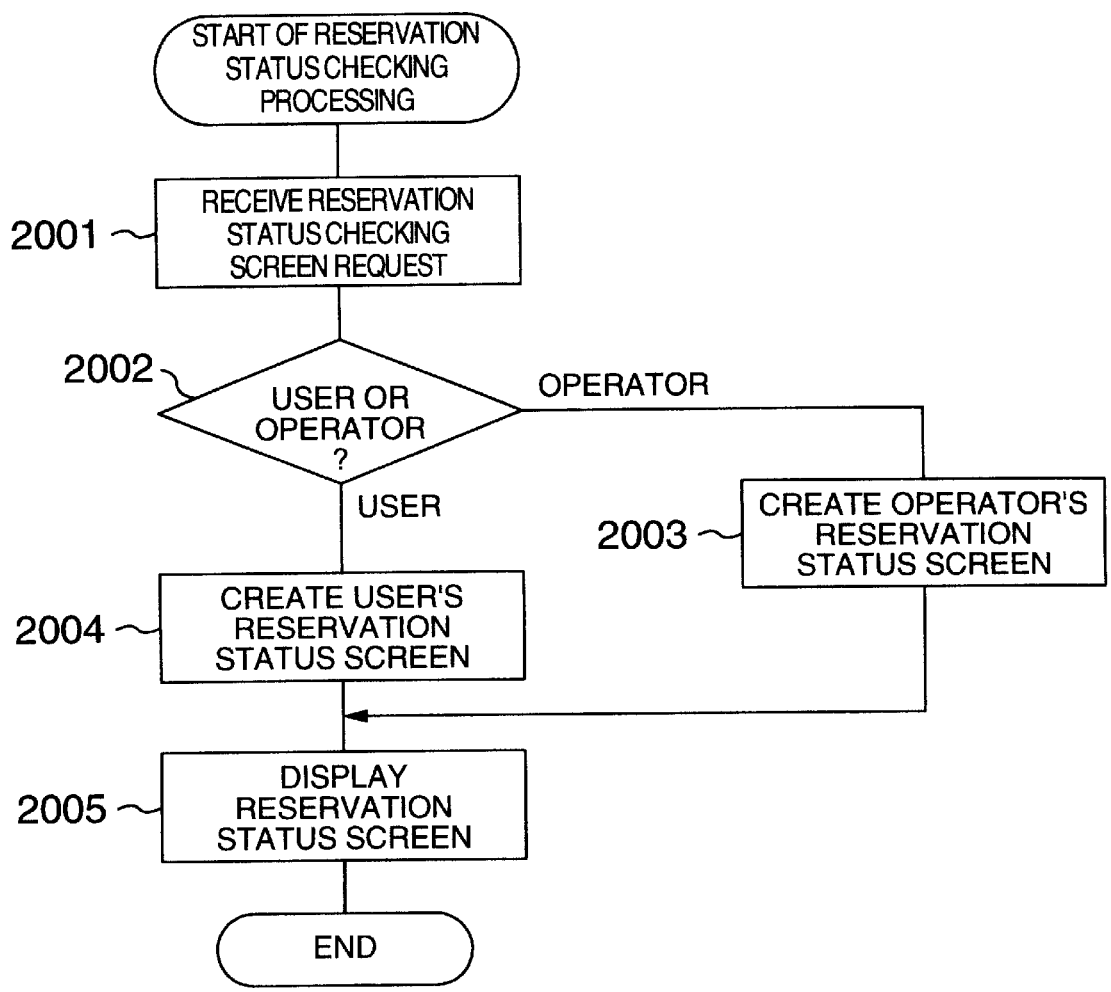
FIG. 16 is an example of a flowchart showing the flow of processing performed when a user or an operator checks reservation status or reservation request processing status.

FIG. 16 is a flowchart showing the flow of processing when a user or an operator checks the reservation status or the reservation request processing status.

First, the flow of processing performed when a user checks the reservation status or the reservation request processing status. The user issues a reservation status checking request from the Internet terminal 1 to the reservation status checking request processor 21, and the reservation status checking request processor 21 receives this checking request (step 2001). In response to the checking request, the reservation status checking request processor 21 checks who has issued the request, a user or an operator (step 2002). If it is found that a user has issued the request, the reservation status checking request processor 21 requests the reservation status creation processor 22 to create the user's screen. In response to the request for creating the user's screen, the reservation status creation processor 22 accesses the reservation information DB 50 and creates the reservation status screen such as the one shown in FIG. 8 (step 2004). Customer information (customer ID, customer name, telephone number) on other users cannot be referenced on this screen. The created screen is displayed on the user's Internet terminal 1 by the reservation status display processor 23 (step 2005).

Next, the flow of processing performed when an operator checks the reservation status or the reservation request processing status will be described. An operator issues a reservation-request-processing status checking request from the acceptance terminal 5 to the reservation status checking request processor 21, and the reservation status checking request processor 21 receives this checking request (step 2001). In response to the checking request, the reservation status checking request processor 21 checks who has issued the request, a user or an operator (step 2002). If it is found that an operator has issued the request, the reservation status checking request processor 21 requests the reservation status creation processor 22 to create the operator's screen. In response to the request for creating the operator's screen, the reservation status creation processor 22 accesses the reservation information DB 50 and creates the reservation request processing status screen such as the one shown in FIG. 12 (step 2003). Unlike the user's screen, information on all users may also be referenced on this operator's screen. Because multiple operators process requests as shown in FIG. 12, multiple reservation IDs are displayed and two or more reservation requests may be processed in the same time zone. The reservation status display processor 23 displays the reservation request processing status screen, created in step 2003, on the operator's acceptance terminal 5 (step 2005).

Next, the flow of processing performed when the operator selects a request from the screen in FIG. 12 will be described.

Figure 17:
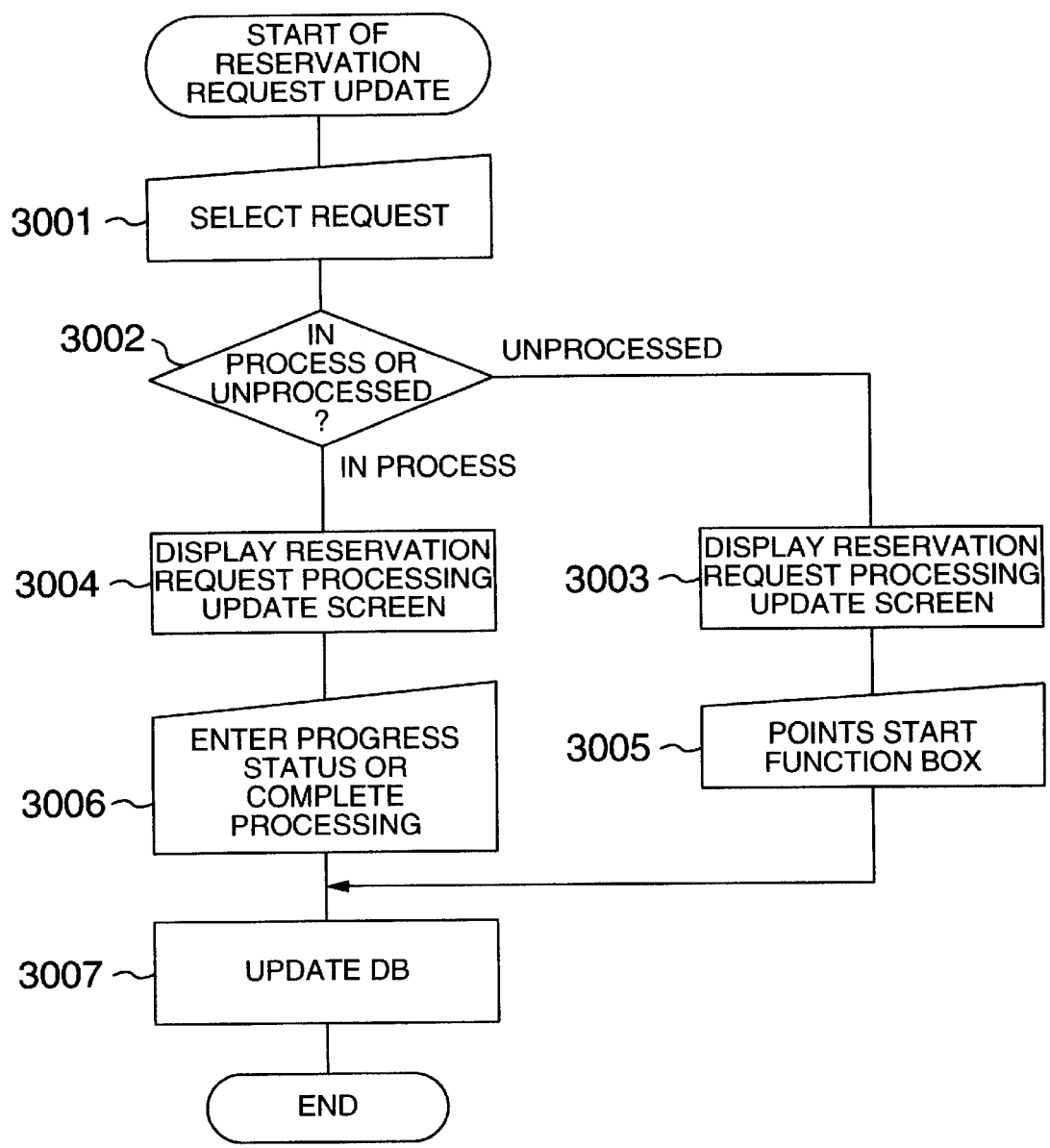
FIG. 17 is an example of a flowchart showing the flow of processing performed when an operator starts processing, reports progress status to date, and completes processing for a reservation request.

FIG. 17 is a flowchart showing how the operator starts processing a reservation request, reports its progress status to date, and completes the processing. In the flowchart, it is assumed that the operator has already issued a reservation status checking request and that the reservation request processing status screen shown in FIG. 12 is displayed on the operator' acceptance terminal 5 according to the procedure indicated by the flowchart in FIG. 16.

From the screen shown in FIG. 12, the operator selects a reservation request 501 whose processing status is to be updated (step 3001). The selected reservation request is passed to reservation-request-processing update request processor 31 to check if the reservation request specified by the update request is unprocessed or in process (step 3002). When the update request is unprocessed, a reservation request processing update screen 600 shown in the top in FIG. 13 is displayed on the operator's acceptance terminal 5 (step 3003). When the update request is unprocessed, the operator points a Start function box 601 to start processing the reservation request (step 3005).

When the reservation request is in process, that is, when an inquiry or a consultation is in process or an investigation is being made, a reservation request processing update screen 604 in the bottom of FIG. 13 is displayed on the operator's acceptance terminal 5 (step 3004). To enter the progress status to date, the operator points an Update data function box 602 and enters the current progress status. When processing is completed, the operator points a Complete function box 603 to end processing for the reservation request (step 3006).

The reservation-request-processing update processor 32 accesses the reservation information DB 50 based on operator-entered data to update the processing status (step 3007).

Next, the following describes how reservation detection processor 41 checks if there is a reservation request that satisfies the reservation condition and, if such a request is found, how the reservation detection processor 41 prompts an operator to call up the user who has made a telephone call.

Figure 18:
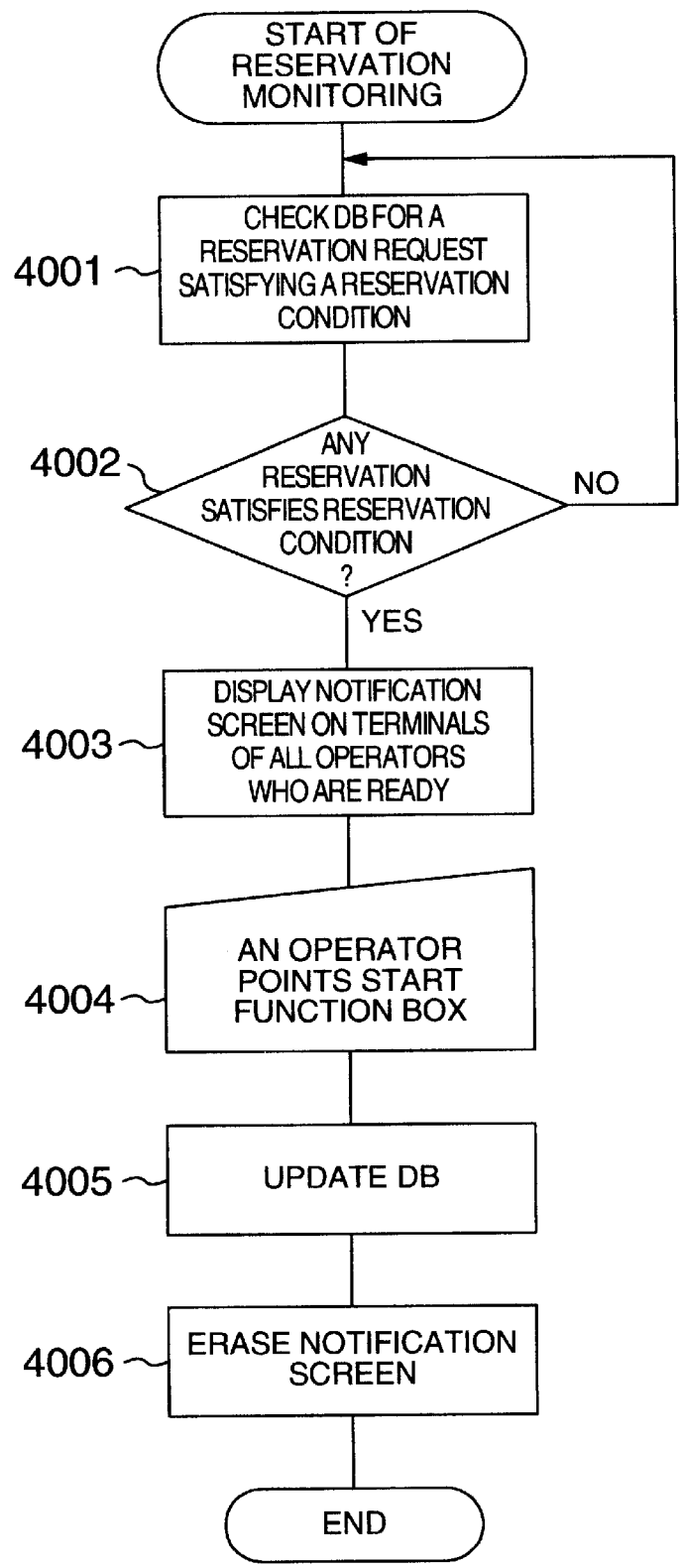
FIG. 18 is an example of a flowchart showing the flow of processing performed when a reservation detection processor detects a reservation request that has reached a user-specified time or that satisfies a specified condition and informs an operator of the reservation request.

FIG. 18 is a flowchart showing the flow of processing performed by the reservation detection processor 41 that detects a reservation request that has reached a user-specified time or satisfies a specified condition and informs an operator of the reservation request.

The reservation detection processor 41 checks the reservation information DB 50 at an interval to check if there is a reservation request that has reached a user-specified time or that satisfies a specified condition (step 4001). If a reservation request that has reached a specified time or that satisfies a specified condition is found (step 4002), the reservation detection processor 41 requests the operator notification processor 42 to notify the operator that there is such a reservation request. In response to this request, the operator notification processor 42 creates a callback notification screen 700, shown in FIG. 14, which sends a message prompting the operator to call up the user who has made the reservation and displays the notification screen on the acceptance terminals 5 of all operators who are ready to process the request (step 4003).

With the reservation ID, customer information (customer ID, name, telephone number), and reservation time displayed on the callback notification screen 700 shown in FIG. 14, an operator points a Start function box 701 and dials the telephone number displayed on the screen to start processing (step 4004). After the operator starts processing, the reservation-request-processing update processor 32 accesses the reservation information DB 50 to update the processing status (step 4005). The operator notification processor 42 erases the notification screen from the acceptance terminals 5 of all operators who are ready to process the request (step 4006) and ends processing.

Although, in the embodiment described above, an operator points the Start function box 701 and dials the telephone number displayed on the screen to start processing, the Start function box 701 may be an automatic dial button.

In the embodiment described above, when there is a reservation request that has reached a specified time or that satisfies a specified condition, the operator notification processor 42 creates the callback notification screen in FIG. 14 to prompt an operator to call up the user who has made the reservation request and displays the notification screen on the acceptance terminals 5 of all operators who are ready to process the request. Instead of this, the operator notification processor 42 may display the notification screen only on the terminals of operators who are free or who are processing a small number of requests.

As described above, the system according to the present invention allows a user, who wants to receive a telephone inquiry or consultation service, to make a callback reservation, eliminating the need for the user to repeatedly make a call even when the telephone operator is busy. Thus, the user can receive a telephone inquiry service or consultation service at a user-specified time and under a user-specified condition.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A reservation system for processing reservations for call-backs placed from user terminals coupled to a data network, said reservation system comprising:

a reservation acceptance unit that accepts reservations for call-backs from users, each of said reservations specifying at least one of a reservation time and a reservation condition;

a reservation status checking unit that displays a reservation status screen on a terminal of an operator in response to a reservation status checking request from the operator;

a reservation-request-processing update unit that updates a processing status of one reservation specified on the reservation status screen, according to an instruction from the operator; and a reservation monitor unit that identifies a reservation responsive to detection of a reservation time or occurrence of a reservation condition specified in the identified reservation, and prompts the operator to call the user who made the identified reservation.

2. The reservation system according to claim 1 wherein said reservation status checking unit displays the reservation status screen in response to a reservation status checking request from the user.

3. A reservation system for processing reservations for call-backs placed from user terminals coupled to a data network, said reservation system comprising:

a reservation acceptance unit that accepts reservations for call-backs from users, each of said reservations specifying at least one of a reservation time and a reservation condition;

a reservation status checking unit that displays a reservation status screen on a terminal of an operator in response to a reservation status checking request from the operator;

a reservation-request-processing update unit that updates a processing status of one reservation specified on the reservation status screen, according to an instruction from the operator; and a reservation monitor unit that identifies a reservation responsive to detection of a reservation time or occurrence of a reservation condition specified in the identified reservation, and prompts the operator to call the user who made the identified reservation;

wherein the reservation status screen displays time zones, reservation request IDs reserved in each of the time zones, and processing statuses of reservation requests associated with the IDs, each processing status indicating one of "processed", "in process", and "unprocessed" and wherein the operator may update, through said reservation-request-processing update unit, the processing status of each reservation request from "unprocessed" to "in process" or to "processed" or from "in process" to "processed".

4. A reservation system for processing reservations for call-backs placed from user terminals coupled to a data network, said reservation system comprising:

a reservation acceptance unit that accepts reservations for call-backs from users, each of said reservations specifying at least one of a reservation time and a reservation condition;

a reservation status checking unit that displays a reservation status screen on a terminal of an operator in response to a reservation status checking request from the operator;

a reservation-request-processing update unit that updates a processing status of one reservation specified on the reservation status screen, according to an instruction from the operator; and a reservation monitor unit that identifies a reservation responsive to detection of a reservation time or occurrence of a reservation condition specified in the identified reservation, and prompts the operator to call the user who made the identified reservation;

wherein, upon detecting that the reservation time specified by the user has come or the reservation condition specified by the user is satisfied, said reservation monitor unit displays a callback notification screen prompting the operator to call up the user who has made the reservation, changes the processing status of the reservation request to "in process" when one of operators who view the callback notification screen points a Start function box on the callback notification screen and, at the same time, erases the callback notification screens of other operators.

5. The reservation system according to claim 1, further comprising a processor that, when making a call to the user for the reservation request, the operator dials a telephone number of the user who has issued the reservation request.

6. A reservation method for processing reservations for call-backs placed from user terminals coupled to a data network, said reservation method comprising the steps of:

accepting a reservation condition specification from a user;

in response to a reservation status checking request from an operator, checking a reservation status with a reservation status screen displayed;

updating a processing status of a reservation request, with the reservation request specified on the reservation status screen, according to an instruction from the operator; and detecting a reservation request reaching a reservation time specified by the user and satisfying a reservation condition specified by the user and, for the detected reservation request, prompting the operator to call up the user who has made the reservation.

7. The reservation method according to claim 6 wherein said step of checking a reservation status displays the reservation status screen in response to the reservation status checking request from the user.

8. The reservation method according to claim 6 wherein the reservation status screen displays time zones, reservation request IDs reserved in each of the time zones, and processing statuses of reservation requests associated with the IDs, each processing status indicating one of "processed", "in process", and "unprocessed" and wherein said step of updating a processing status of a reservation request comprises the steps of receiving an indication from the operator and updating a value of the processing status of the reservation request from "unprocessed" to "in process" or to "processed" or from "in process" to "processed".

9. The reservation method according to claim 6 wherein said step of detecting a reservation request comprises the steps of displaying a callback notification screen prompting the operator to call up the user who has made the reservation upon detecting that the user-specified reservation time has come or the user-specified reservation condition is satisfied, changing the processing status of the reservation request to "in process" when one of operators who view the callback notification screen points a Start function box on the callback notification screen, and erasing the callback notification screens of other operators.

10. The reservation method according to claim 6, further comprising the step of dialing a telephone number of the user who has issued the reservation request when the operator makes a telephone call to the user for the reservation request.

11. The reservation system according to claim 3, wherein said reservation status checking unit displays the reservation status screen in response to a reservation status checking request from the user.

12. The reservation system according to claim 4, wherein said reservation status checking unit displays the reservation status screen in response to a reservation status checking request from the user.

* * * * *